(12) United States Patent
Herrera

(10) Patent No.: US 6,538,658 B1
(45) Date of Patent: Mar. 25, 2003

(54) METHODS AND APPARATUS FOR PROCESSING DVD VIDEO

(75) Inventor: Alex John Herrera, Burlingame, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 73 days.

(21) Appl. No.: 09/677,823

(22) Filed: Sep. 30, 2000

Related U.S. Application Data

(62) Division of application No. 08/963,931, filed on Nov. 4, 1997, now Pat. No. 6,208,350.

(51) Int. Cl.[7] ................................................. G09G 5/00
(52) U.S. Cl. ...................... 345/582; 345/589; 345/503; 345/600
(58) Field of Search ................................. 345/582, 589, 345/583, 600, 441, 385

(56) References Cited

U.S. PATENT DOCUMENTS 5,870,097 A * 2/1999 Snyder et al. .............. 345/426
6,333,743 B1 * 12/2001 Gossett et al. .............. 345/582

* cited by examiner

Primary Examiner—Mark Zimmerman
Assistant Examiner—Mano Padmanabhan

(57) ABSTRACT

A 3D graphics accelerator is modified to support MPEG-2 video decoding in a computer system configured to playback a DVD data stream. The methods and apparatus modify the 3D graphics accelerator to conduct motion compensation and/or YUV 4:2:0 to YUV 4:2:2 conversion. Sub-code blending can also be further supported by the 3D graphics accelerator.

22 Claims, 8 Drawing Sheets

| DVD PROCESS | PROCESSOR BURDEN | HARDWARE COST |
|---|---|---|
| SYSTEM PARSING / VLD | 20% | HIGH |
| IDCT / IQUANT | 12% | MODERATE |
| MOTION COMPENSATION | 30% | LOW |
| YUV 4:2:0 CONVERSION | 25% | LOW |
| RGB CONVERSION | 0% | EXISTING |
| SUB-PICTURE BLEND | N/A | LOW |
| AC-3 DECODE | 13% | MODERATE |

FIG. 3

METHODS AND APPARATUS FOR PROCESSING DVD VIDEO

CROSS REFERENCE TO RELATED APPLICATIONS

This is a divisional of application Ser. No. 08/963,931, filed Nov. 4, 1997, now U.S. Pat. No. 6,208,350.

TECHNICAL FIELD

The present invention relates to computers, and more particularly to methods and apparatus for processing a Digital Versatile Disk (DVD) data stream using a computer.

BACKGROUND ART

The emergence of DVD (Digital Versatile Disk) technology presents a tremendous market growth opportunity for the personal computer (PC). It also presents a significant technical challenge to the highly cost-competitive PC market, namely providing a cost effective PC architecture that provides the digital video performance and quality that the user demands while also remaining flexible enough to support a range of other PC applications.

As known, DVD technology presents a significant leap forward for today's multimedia PC environment. In addition to providing backward compatibility to CD-ROM, current DVDs provide a storage capacity of between 4.7 GB and 17 GB, which is at least about 8 times the storage capacity of a typical CD. To support this increased storage capacity, DVD devices, such as DVD-ROM drives, typically provide bandwidths in excess of 10 Mb/s. By combining DVD technologies with video compression technologies, such as MPEG-2 video compression techniques, and audio compression technologies, such as MPEG-2 and AC-3 audio techniques, a PC can deliver better-than-broadcast quality television (TV) to a video display device and an audio reproduction device.

DVD also presents an avenue for PC technology to migrate to various new market segments. DVD is being embraced not only by the PC industry, but also by the entertainment and consumer electronics industries. As such, many PC manufacturers and software developers consider DVD to represent the next step in turning desktop PCs into full-fledged entertainment appliances. For example, new products, described as everything from entertainment PCs to set-top PCs and PC-TVs, are beginning to be promoted. By way of example, manufacturers such as Gateway and Compaq are beginning to ship products tailored specifically for delivering video and computer-based entertainment in the home. Additionally, Philips has recently announced its DVX8000 Multimedia Home Theatre product that is targeted for the living room and based on the PC architecture. Recognizing and promoting this trend, Microsoft is attempting to define a unique set of platform requirements for this new breed of "Entertainment PC".

While the future looks very bright for DVD on various PC platforms, there's the immediate problem of how to make the technology work within the constraints of today's PC architecture as well as the extremely cost-sensitive reality of the PC marketplace. MPEG-2 standards present an especially difficult problem, because of the amount of processing that is required to decode and decompress the typical 5 Mb/second MPEG-2 video signal into a displayable video signal. Additionally, the accompanying audio signal also needs to be decoded and possibly decompressed. Consequently, PC architectures having DVD capabilities tend to be too costly for the mainstream market and/or lack the necessary performance to perform adequately.

To achieve its goals of quality, storage and data bit-rate, the DVD video standard leverages several existing audio and video compression and transmission standards, including MPEG-2 video and both AC-3 and MPEG-2 audio. By way of example, FIG. 1 depicts a typical DVD processing pipeline in which a DVD data stream is received, for example, from a DVD-ROM drive and/or from a remote device, and converted into a decoded and decompressed digital video signal and corresponding digital audio signal (s).

A DVD data stream consists of sequential data packets, each of which typically includes various system information, video information and audio information. The DVD video decode pipeline 10 depicted in FIG. 1 has been broken down into three high-level processing stages, namely a system stream parsing stage 12, a video processing stage 14, and an audio processing stage 16. Additional information regarding these processing stages and others, and the DVD and MPEG-2 standards are provided in the DVD specification, entitled DVD Specification, Version 1.0, August 1996, and in the MPEG-2 video specification ISO/IEC 13818-1, 2, 3 is available from ISO/IEC Copyright Office Case Postale 56, CH 1211, Genève 20, Switzerland, each of which are incorporated herein, in their entirety and for all purposes, by reference.

In system stream parsing stage 12, the incoming DVD data stream is split or demultiplexed and/or descrambled, for example using CSS decryption techniques, into three independent streams: a MPEG-2 video stream 15, a MPEG-2 (or AC-3) audio stream 17, and a sub-picture stream 13. By way of example, in certain embodiments, the MPEG-2 video stream 15 can have a bit-rate as high as approximately 9 Mb per second, and the audio stream 17 (MPEG-2 or AC-3) can have a bit-rate as high as approximately 384 Kb per second. The sub-picture stream 13 tends to have a relatively lower bit-rate, and includes sub-picture information that can be incorporated into the final digital video signal as on-screen displays ( OSDs), such as menus or closed captioning data. The MPEG-2 video stream 15 and sub-picture stream 13 are then provided to video processing stage 14 for additional processing. Similarly, the audio stream 17 is provided to audio processing stage 16 for further processing.

Video processing stage 14, as depicted in FIG. 1, includes three sub-stages. The first sub-stage is a DVD sub-picture decode 18 stage in which the sub-picture stream 13 is decoded in accordance with the DVD specification. For example, DVD allows up to 32 streams of sub-picture that can be decoded into a bitmap sequence composed of colors from a palette of sixteen colors. As mentioned above, the decoded sub-pictures are typically OSDs, such as menus, closed captions and sub-titles. In accordance with the DVD specification, the sub-picture(s) are intended to be blended with the video for a true translucent overlay in the final digital video signal.

The second sub-stage of video processing stage 14 is a MPEG-2 decode sub-stage 20 in which the MPEG-2 video stream is decoded and decompressed and converted to a YUV 4:2:2 digital video signal. In accordance with the MPEG-2 specification, MPEG-2 decode sub-stage 20 conducts a Variable Length Decode (VLD) 22, an inverse quantization (IQUANT) 24, an Inverse Discrete Cosine Transform (IDCT) 26, motion compensation 28, and a planar YUV 4:2:0 to interleaved 4:2:2 conversion 30. These processing sub-stages are necessary because the MPEG-2 specifies that certain pictures, called I frames or pictures, are "intra" coded such that the entire picture is broken into 8×8 blocks which are processed via a Discrete Cosine Transform (DCT) and quantized to a compressed set of coefficients that, alone, represent the original picture. The MPEG-2 specification also allows for intermediate pictures, between "I" pictures, which are known as either predicted ("P" pictures) and/or bidirectionally-interpolated pictures ("B" pictures). In these intermediate pictures, rather than encoding all of the blocks via DCT, motion compensation information is used to exploit the temporal redundancy found in most video footage. By using motion compensation, MPEG-2 dramatically reduces the amount of data storage required, and the associated data bit-rate, without significantly reducing the quality of the image. Thus, for example, motion compensation allows for a 16×16 "macroblock" in a P or B picture to be "predicted" by referencing a macroblock in a previous or future picture. By encoding prediction pointers—called motion vectors—MPEG-2 is able to achieve high compression ratios while maintaining high quality.

The resulting YUV 4:2:2 and decoded sub-picture digital video signals are then provided to the third sub-stage 21 of video processing stage 14 which the YUV 4:2:2 and decoded sub-picture digital video signals are blended together in an alpha blend process 32 to produce a translucent overlay, as described above and in detail in the DVD specification. Next, the blended digital video signal is provided to a YUV-to-RGB conversion process 34, in which the blended digital video signal is converted from a YUV format into a corresponding red-green-blue (RGB) format. The resulting RGB digital video signal is then provided to an image scaling process 36, in which the RGB digital video signal is scaled to a particular size for display. The resulting final digital video signal is then ready to be displayed on a display device, or otherwise provided to other devices, such as video recording or forwarding devices. For example, the final digital video signal can be displayed on a monitor or CRT by further converting the final digital video signal (which is in RGB format) to an analog RGB video signal.

The processing stages/sub-stages associated with DVD processing pipeline 10 tend to be extremely compute intensive. The MPEG-2 video format, which is the most compute intensive portion of pipeline 10, was chosen for DVD technologies because it provides the best quality playback across a range of differing display formats, and is well suited to DVD's higher bit-rates and storage capacity. For example, MPEG-2 video is flexible and scalable and can be used to support a wide range of display formats and aspect ratios, from standard interlaced NTSC to high-definition, 16:9 progressive scans. One example of a compute intensive MPEG-2 display format, is the Main-Profile, Main-Level (MPML) MPEG-2 format, which supports a 720×480 pixel display operating at 60 fields/sec or 30 frames per second (fps).

Referring back to FIG. 1, the audio stream is provided by system stream parsing stage 12 to audio processing stage 16. Audio processing stage 16 decodes either Dolby AC-3, with 6 channels (e.g., 5.1 channels) of audio for high-quality surround sound reproduction, as specified for use in NTSC compliant devices, or MPEG-2 (up to 7.1 channels), as specified for in PAL and SECAM compliant devices. The resulting final digital audio signal is capable of being reproduced, for example, by conversion to an analog signal that is provided to an audio reproduction device, such as a sound generating device that converts the digital audio signal to an analog signal, amplifies or otherwise conditions the analog signal, and provides the signal to one or more speakers. As would be expected, decoding the audio stream tends to be much less compute intensive than decoding the video stream.

A vital consideration for PC manufacturers and consumers alike, in providing DVD capabilities, is cost. Because the DVD processes outlined above are compute intensive there is need to deliver cost-effective solutions that essentially reduce the costs associated with the various stages/sub-stages of the DVD processing pipeline. The currently available solutions can be grouped into one of three basic types.

The first type of solution, places the DVD processing task entirely on the processor within the computer, and as such is a software-only solution. By completing all of the DVD pipeline via software (e.g., computer instructions) running on the PC's processor, there is basically no need to add additional "DVD" related hardware components in most PC architectures. However, in order to complete the DVD processing, the PC's processor would need to be sufficiently powerful enough (e.g., operating speed). Currently, the latest Intel Pentium II processor based platforms are only able to provide frame rates up to about 24 frames per second (fps). To provide greater than about 24 fps, the Pentium II based platforms require additional hardware support, typically to complete the motion compensation process 28. However, given the improvements in processor performance in the past and expected in the future, it appears that it will soon be possible to implement full frame rate DVD decoding via a PC's processor. The cost associated with such a state-of-the-art processors may, nonetheless, be prohibitive for many PC consumers. Additionally, a DVD playback may place such a burden on the PC's processor and associated bus(es) and memory that the PC is unable to do little more during the playback. For many users, this operation may prove unacceptable. It is also possible, as witnessed recently, that certain short cuts may be taken by a software-only solution that are not in accord with the DVD specification. For example, some software-only solutions simplify the alpha blend process 36 by simply selecting, on a pixel by pixel basis, to display either the sub-picture pixel or the MPEG derived pixel, rather than actually blending the two pixels together to provide a translucent effect. Again, short cuts such as these tend to diminish the DVD capabilities and can result in non-compliant devices.

The second type of solution, places the DVD processing task entirely on the PC's hardware, without requiring the processor. This hardware-only solution tends to free up the processor. However, providing such specialized circuitry (e.g., a DVD decoder) can be very expensive and result in significantly increased costs, which can be devastating in the highly competitive PC market. The specialized circuitry can also reduce the performance of the PC by requiring access to the PC's bus(es), interfaces and memory components, in some PC architectures.

The third type of solution is a hybrid of the first two types of solutions, and requires that the DVD processing tasks be distributed between the PC's processor (i.e., software) and specialized circuitry (e.g., a decoder) that is configured to handle a portion of the processing. The hybrid solution is flexible, in that it allows for different configurations that can be fine-tuned or modified for a given PC architecture/application. However, there is still an additional expense associated with the specialized circuitry, which can increase the consumer's cost.

There is a need for cost-effective, improved, and compliant methods and apparatus for providing DVD playback capabilities in a computer, such as, for example, a PC.

SUMMARY OF THE INVENTION

The present invention provides an improved and cost effective hybrid solution in the form of methods and apparatus that allow DVD data streams to be played back in a computer system. In accordance with one aspect of the present invention, the methods and apparatus allow for compliant DVD and/or MPEG-2 video playback by conducting specific decoding processes in a graphics engine that is also capable of generating graphics based on command signals.

Thus, in accordance with one embodiment of the present invention, an apparatus is provided for use in a computer system having a processor to support graphics generation and digital video processing. The apparatus includes a set-up engine, a converter and a texture mapping engine. The set-up engine is responsive to at least one command signal from the processor and converts vertex information within the command signal into corresponding triangle information. The triangle information describes a triangle in a three dimensional space. The converter determines digital pixel data for the triangle based on the triangle information. The texture mapping engine modifies the digital pixel data based on the triangle information and at least one digital texture map. As such, the apparatus supports graphics generation. The texture mapping engine also generates motion compensated digital image data based on at least one digital image map and at least one motion vector to support digital video processing.

In accordance with certain embodiments of the present invention, the digital image map is a macroblock containing a digital pixel data from a MPEG generated I and/or P picture. In accordance with further embodiments of the present invention, the texture mapping engine includes at least one bilinear interpolator that determines interpolated digital pixel data based on a first and a second digital pixel data. As such, the bilinear interpolator is used to perform a bilinear filtering of a macroblock that is on sub-pixel sample points to generate one predicted macroblock that is on pixel sample points. In still other embodiments, the texture mapping engine performs a first bilinear filtering based on a first motion vector and on a second bilinear filtering based on a second motion vector, and averages the results of the first bilinear filtering and the results of the second bilinear filtering to generate one predicted macroblock. In certain embodiments, the apparatus is configured to add an IDCT coefficient to the digital pixel data as generated by the texture mapping engine. As such, certain embodiments of the present invention are capable of supporting MPEG-2 motion compensation processing.

In accordance with certain other embodiments of the present invention, the apparatus is further configured to generate a YUV 4:2:2 formatted picture by providing vertical upscaling, and interleaving of a YUV 4:2:0 formatted picture.

The above stated needs and others are also met by a computer system, in accordance with one embodiment of the present invention, that is capable of providing video playback of an encoded data stream. The computer system includes a processor, a data bus mechanism, a primary memory, a display device, and a graphics engine that is configured to generate digital image data based on at least one command signal from the processor, generate motion compensated digital image data based on at least one digital image and at least one motion vector, convert a YUV 4:2:0 formatted picture to a YUV 4:2:2 formatted picture, convert the YUV 4:2:2 formatted picture to a RGB formatted picture, scale the RGB formatted picture, and convert the RGB formatted picture to an analog signal that can be displayed on the display device.

A method is provided, in accordance with the present invention for generating graphics and processing digital video signals in a computer system. The method includes using a graphics engine to generate digital image data, based on at least one command signal by converting vertex information within the command signal into corresponding triangle information, determining digital pixel data for the triangle, based on the triangle information, and modifying the digital pixel data based on the triangle information and at least one digital texture map. The method further includes using the same graphics engine to generate motion compensated digital image data by generating motion compensated digital image data based on at least one digital image map and at least one motion vector.

In accordance with certain embodiments of the present invention, the method further includes using the same graphics engine to convert a YUV 4:2:0 formatted picture to a YUV 4:2:2 formatted picture by offsetting at least a portion of the YUV 4:2:0 formatted picture and selectively mapping samples of the YUV 4:2:0 formatted picture to a corresponding destination picture to provide a vertical upscaling, and selectively arranging byte data of the destination picture to interleave the byte data and generate the YUV 4:2:2 formatted picture.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements in which;

FIG. 3 is a table depicting the results of an analysis of an exemplary computer system conducting specific portions of the DVD processing pipeline of FIG. 1 in which the relative workload burden (percentage) placed on the computer system's processor is listed along with a relative estimated measurement of the same or similar DVD related process being conducted in a hardware implementation alone, in accordance with one embodiment of the present invention;

DETAILED DESCRIPTION OF THE EXEMPLARY EMBODIMENTS

Figure 1:
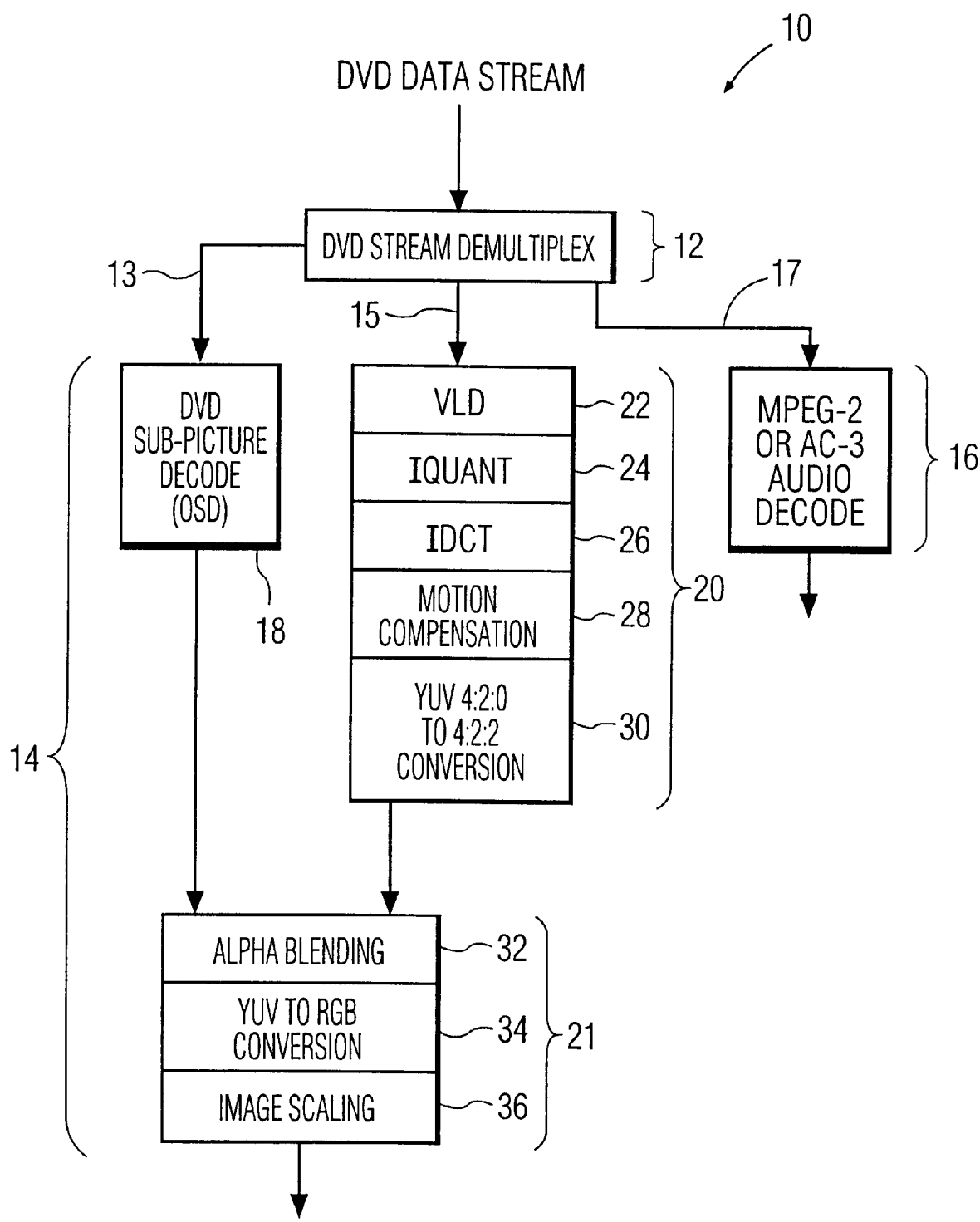
FIG. 1 is block diagram depicting a typical prior art DVD processing pipeline for use with a computer.

The detailed description of the methods and apparatus of the present invention builds on the information presented earlier in the background art section, and has been divided into titled subsections.

Existing PC Architectures Supporting DVD Playback

To further illustrate the types of solutions as described above, FIG. 2a depicts a typical PC system 40 having a processor 42 that is configured with a software-only solution, as represented by DVD processing pipeline computer instruction set 44. Processor 42 represents one or more processors, such as, for example, an Intel Pentium family processor or Motorola PowerPC processor. Processor 42 is coupled to a chip set 46. Chip set 46 provides access to/from processor 42, to/from a primary memory, such as dynamic random access memory (DRAM) 48, and to/from one or more data bus(es), such as, peripheral component interface (PCI) bus 50 and/or ISA bus 52.

As shown, a graphics accelerator 54 is also coupled to PCI bus 50 and is configured to interface with processor 42 and/or DRAM 48 via PCI bus 50 and chip set 46, or other devices (not shown) on PCI bus 50 and/or ISA bus 52. Graphics accelerator 54 is coupled to a double buffering, frame buffer 56 and is configured to output an analog video signal to display 58. ISA bus 52, which typically has a lower bit-rate than PCI bus 50, is provided to allow one or more devices to be coupled to ISA bus 52 through which they can interface with processor 42, DRAM 48, or other devices on PCI bus 50 and/or ISA bus 52. For example, a sound reproduction device 60 is depicted as being coupled to ISA bus 52. Sound reproduction device 60, in this embodiment, is configured to receive the final digital audio signal from processor 42 and output corresponding audio tones, or sound. At least one storage device 62 is also shown as being coupled to ISA bus 52. Storage device 62 represents a variety of storage devices, including, for example, a disk drive, a tape drive, and/or an optical storage device (e.g., read only memory (ROM) and/or RAM) such as a CD, or DVD drive.

Figure 2A:
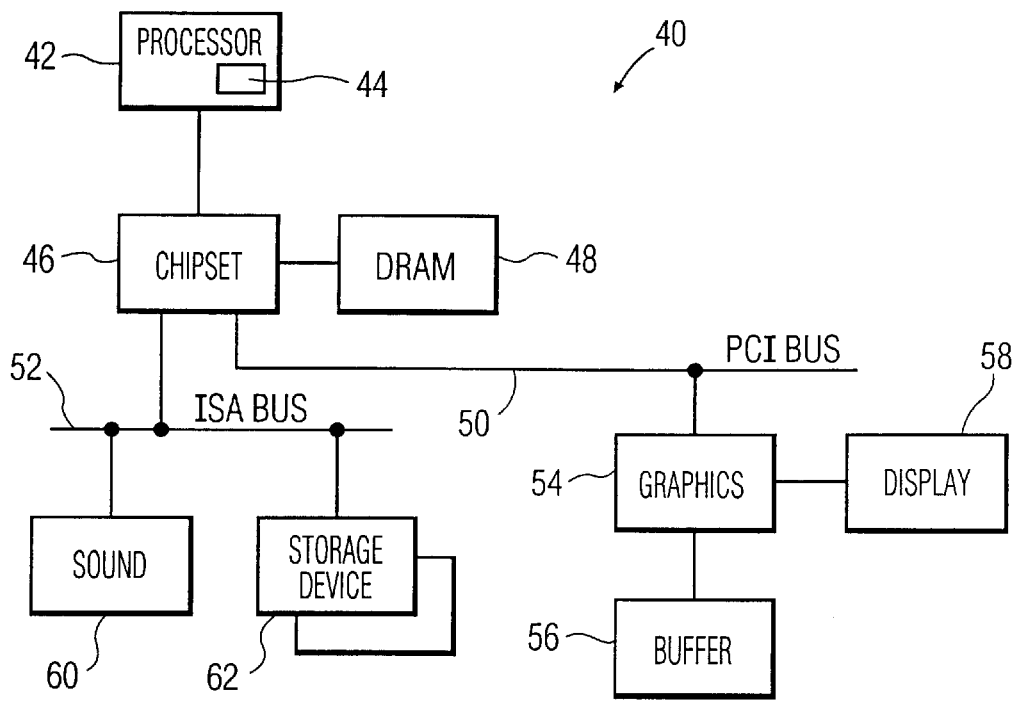
FIGS. 2a and 2b are block diagrams depicting typical prior art computer systems that are configured to conduct all or a portion of the DVD processing pipeline of FIG. 1.

In FIG. 2a, for example, if storage device 62 is a DVD-ROM then during playback a DVD data stream is provided to processor 42, through ISA bus 52 and chip set 46. The DVD data stream that is output by storage device 62 is typically retrieved from the DVD and may be have been decrypted or otherwise processed by storage device 62 prior to being provided to processor 42. In a software-only solution, processor 42 completes the DVD processing in accord with DVD processing pipeline computer instruction set 44. This processing typically includes accessing DRAM 48 through chip set 46, for example, to store/retrieve intermediate data during processing. The final digital video signal is then provided by processor 42 to graphics accelerator 54, through chip set 46 and PCI bus 50. Graphics accelerator 54 stores the final digital video signal within buffer 56, and subsequently retrieves the final digital video signal from buffer 56, converts the final digital video signal into a final analog video signal, for example, using a digital-to-analog converter (DAC). The final analog video signal is then provided to display device 28. Processor 42 also provides the final digital audio signal to sound reproduction device 60, which converts the final digital audio signal to sound.

Figure 2B:
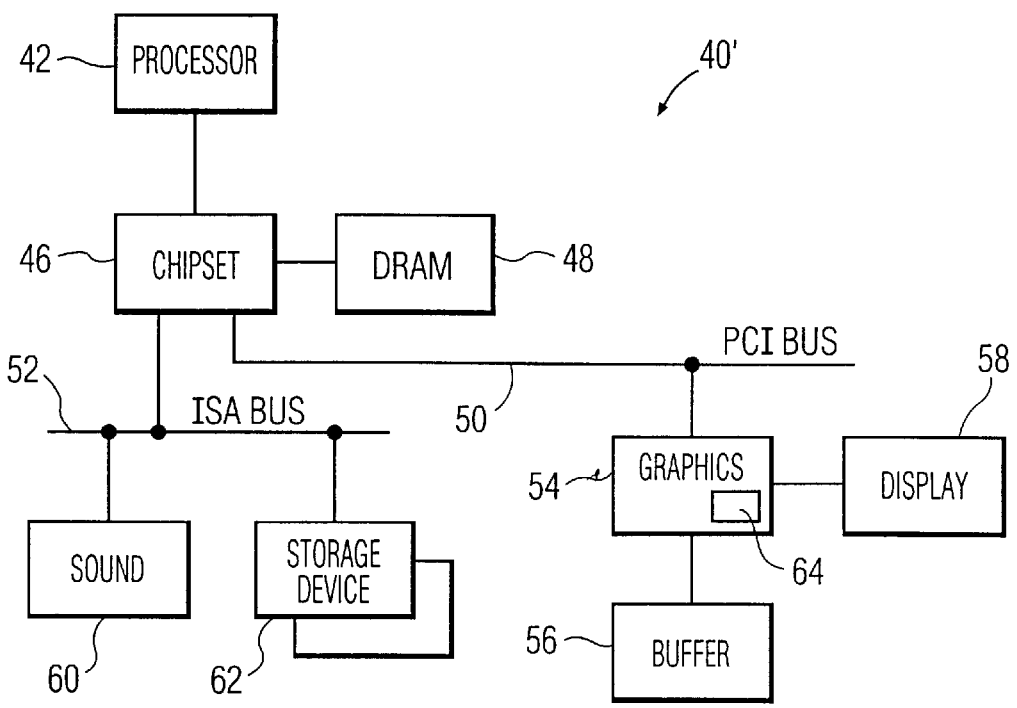

FIG. 2b is similar to FIG. 2a, and as such like reference numerals refer to like components. FIG. 2b depicts a PC system 40', which is configurable either as a hardware-only solution or as a hybrid solution. As shown, in FIG. 2b, additional specialized processes/circuitry is provided, as represented by decoder 64.

When system 40' is configured as a hardware-only solution, significantly all of the DVD processing pipeline in FIG. 1 is completed in decoder 64. When configured as a hybrid solution, system 40' will have a portion of the DVD processing pipeline (e.g., see FIG. 1) being completed by processor 42 prior to, and/or following, partial processing by decoder 64. For example, decoder 64 can be configured to complete motion compensation process 28.

Analysis of DVD Related Processes

Considering the three types of solutions, the natural advantage of the software-only solution is cost-effectiveness (ignoring the cost of the processor 42). The software-only solution exploits the processing power that already exists ( and the customer has already paid for) to deliver DVD playback for essentially no incremental cost. The downside is that today's software-only solutions tend to fall short on frame rate, quality and functionality, and are limited by a lack of processing speed in the typical processor. For example, even with the recent addition of MMX™ technology, neither 1997's mainstream Pentium™ nor even 1998's mainstream Pentium II™ machines will provide smooth, broadcast quality DVD playback at the full 30 fps.

A hardware-only solution which implements all of the DVD processing pipeline in silicon, for example, eases the burden on the processor, and can be used to deliver seamless, full frame, high quality video for typical 5 Mb/sec DVD video, that is displayed faithfully to the source material with no added artifacts. However, one problem with simply adding hardware is cost. The notoriously competitive PC graphics controller market has historically resisted higher prices for graphics controllers and additional decoders. Indeed, graphic controller chip prices have remained remarkably flat and have even decreased over time, despite increased capabilities. This requires the manufacturers of graphics accelerators and other like chips to be extremely judicious as to how much functionality to commit to hardware.

For example, it has been estimated that the a decoder 64 for use in a hardware-only solution will likely consume at least approximately 72,000 gates of logic (or equivalent) to effectively process MPEG-2 system, audio and video decode. Additionally, adding the functionality of decoder 64 to an existing graphics accelerator would also appear unreasonable, because in today's cost-effective CMOS processes, gate counts in this range are usually too prohibitive in cost to consider for inclusion in a mainstream PC graphics accelerator chip. As such, supporting DVD playback with a hardware-only solution does not appear to be a viable solution in the near term for the bulk of the PC market.

Ideally, the mainstream desktop PC would provide the quality and performance of a hardware-only solution with the cost effectiveness of a software-only implementation. This calls for a cost-effective hybrid solution. The present invention provides methods and apparatus for a very cost-competitive hybrid solution that combines the performance of a hardware solution and the cost and simplicity of a software solution.

Arriving at the optimal hybrid solution, in accordance with the present invention, was the result of extensive analysis of the DVD processing pipeline which identified performance bottlenecks and assessed the complexity and cost of implementing the various stages of the pipeline in hardware. In accordance with one aspect of the present invention, one important goal was to commit to hardware those tasks that consume the larger amounts of processing time without significantly increasing the hardware cost. Another important goal was to take advantage of the graphics accelerator chip, which nearly all PC platforms require to support displaying graphics.

Results of this analysis, for an exemplary architecture, are shown in the table in FIG. 3. Based on this analysis, it was determined that the high-level decode of system and security layers and MPEG-2 VLD were ruled out of consideration for hardware implementation, since these tasks are not overwhelmingly compute intensive and much better suited to the general purpose programmability of the processor 42, rather than, for example, a modified graphics accelerator.

Similarly, the IDCT and IQUANT processes were eliminated from consideration, since the processor overhead was relatively small, and hardware impact would be significant. For example, the IDCT and IQUANT processes tend to rely heavily on multiplies, adds, and multiply-accumulate (MAC), operations, which, for example, Pentium II™-class processors (particularly those with MMX™ technology) execute fairly well.

AC-3 audio was also eliminated from consideration for several reasons. Foremost, it doesn't require a dominant share of the processor time due in part, for example, to MMX™ assistance available on some processors. The audio processing also tends to require the addition of non-trivial hardware size and complexity. Since audio and graphics/video are usually physically separated within today's mainstream PC architecture, it made more sense to leave AC-3 processing either to the processor 42 or an audio subsystem rather than attempting to do it in a modified graphics accelerator.

Thus, in accordance with one embodiment of the present invention, it was determined that offloading the motion compensation process 28, YUV 4:2:0-to-4:2:2 conversion process 30 and the alpha blending process 32 appeared to offer the biggest return on implementation cost. These processes were therefore assigned to a modified graphics accelerator 84 (see FIG. 8). In fact, by offloading the motion compensation 28 and planar YUV 4:2:0-to-4:2:2 conversion 30 processes to the modified graphics accelerator 84, it is expected that a PC can achieve the ultimate goal of 60 fields/sec (30 fps) playback performance on a 266 MHz Pentium II™ platform.

By committing the alpha blending process 32 to hardware, true translucent display of sub-picture(s) is made possible, as opposed to prior art that software-only solutions running on even tomorrow's platforms, since the typical alpha blend process 32 tends to require a table lookup, and two adds and two multiplies (or shifts and adds) for each pixel. Given this compute intensive process, most software-only solutions are forced to compromise the OSD functionality and instead use opaque "colorkey" overlaying of the sub-picture on video, rather than the translucent display the DVD specification intended.

With the motion compensation, YUV 4:2:0-to-4:2:2 conversion and alpha blending processes identified as the most desirable features to commit to silicon, the disclosed embodiment provides a simple, robust, and cost-effective implementation. By comparing the current graphics accelerator architecture with these processes, it was found that the existing hardware could be modified at a very low cost to provide the appropriate DVD related processing.

Overview of Proposed Hybrid Solution Using a Modified Graphics Accelerator

Thus, the methods and apparatus of the disclosed embodiment present a unique hybrid solution, which achieves full-frame, compliant DVD, by modifying the existing graphics accelerator hardware and software driver, at virtually no additional cost to the consumer. In accordance with the present invention, certain three dimensional (3D) texture mapping processes, which are typically supported by most of the existing 3D engines within a typical graphics accelerator, have been identified as being similar to the motion compensation and YUV 4:2:0-to-4:2:2 conversion processes.

These processes can be implemented almost completely with operations already supported in the existing 3D graphics engine. All that is required to complete these processes, is to add a few additional circuits that extend the way in which the modified graphics accelerator handles certain cases, specific to MPEG-2 decoding. The result is a full performance, modified graphics accelerator that can be combined with an appropriately programmed processor 42, at substantially no incremental cost per PC, to provide an optimal hybrid solution for DVD playback when configured with appropriate software.

Figure 8:
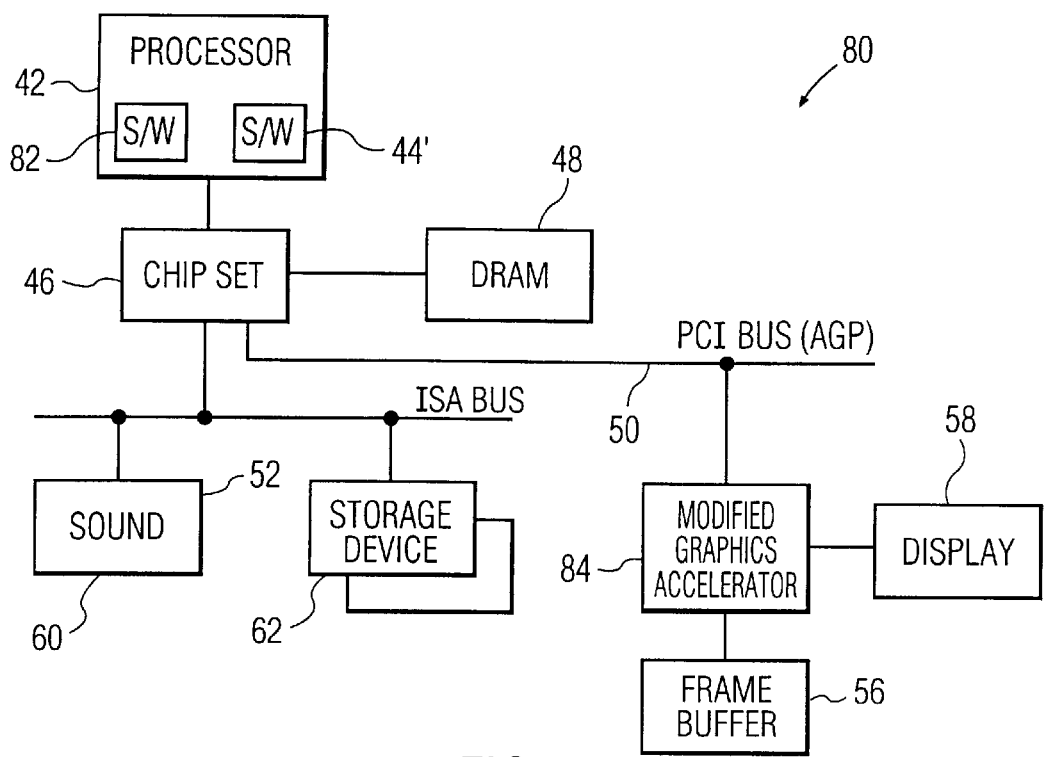
FIG. 8 is a block diagram depicting a computer system having a processor, a modified graphics accelerator and a frame buffer, in accordance with one embodiment of the present invention.

FIG. 8, which is similar to FIG. 1*a*, depicts an improved computer system 80 having processor 42 configured to run a portion 44' of the DVD process pipeline and a modified graphics accelerator 84, in accordance with one embodiment of the present invention.

To understand how, in accordance with the disclosed embodiment, a 3D graphics engine within modified graphics accelerator 84 performs the motion compensation, YUV 4:2:0-to-4:2:2 conversion, and/or alpha blending processes, an exemplary 3D graphics engine/process is described in greater detail below.

Exemplary Graphics Accelerator

Figure 4:
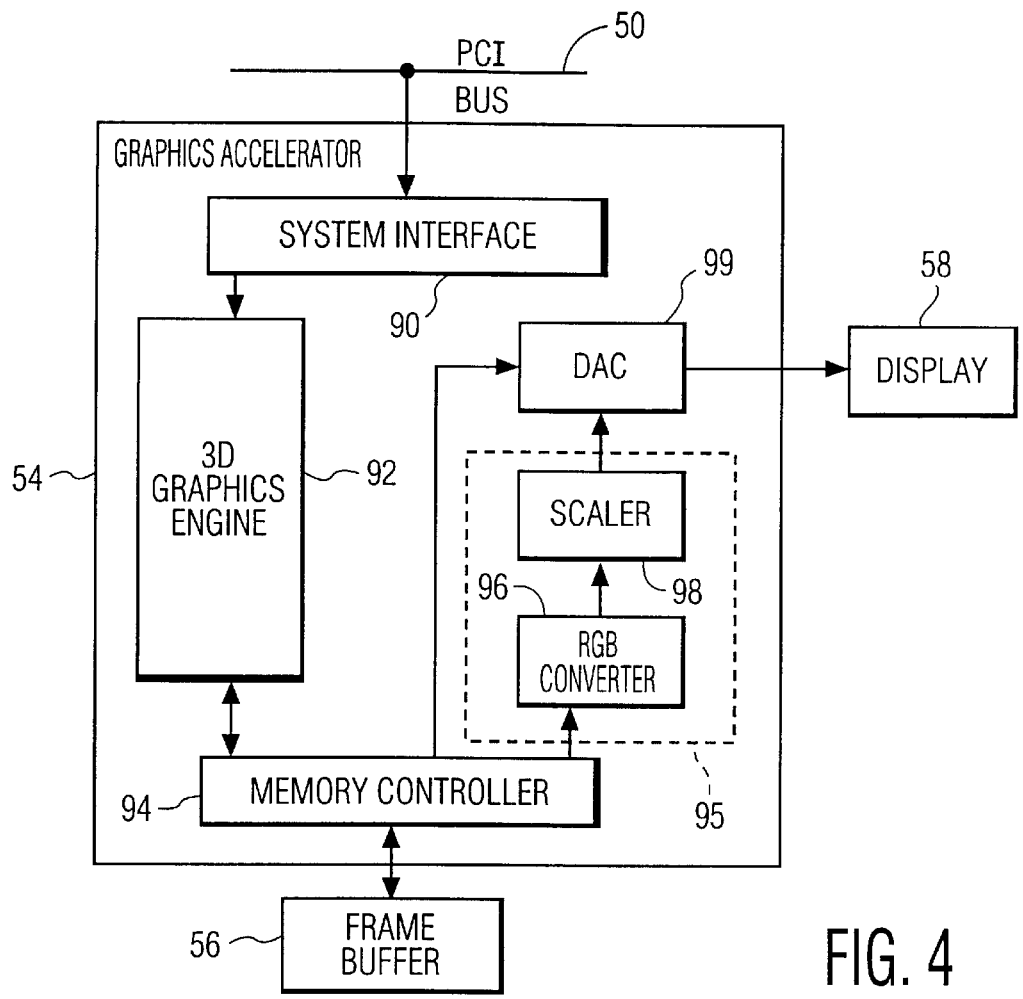
FIG. 4 is a block diagram depicting an exemplary graphics accelerator having a 3D graphics engine for use in a computer system, as in FIG. 2a, in accordance with the present invention.

FIG. 4 is a block diagram of an exemplary graphics accelerator 54. As shown, graphics accelerator 54 includes a system interface 90, which is coupled to PCI bus 50, or alternatively to an advanced graphics port (AGP) on chip set 46. System interface 90 is configured to provide an interface to PCI bus 50 (or the AGP) through which graphics generating commands are received, for example from processor 42. A 3D graphics engine 92 is coupled to system interface 90. 3D graphics engine 92 is configured to generate 2D images based on 3D modeling information. The 2D images from 3D graphics engine 92 are typically digital images in a RGB format. The 2D images from 3D graphics engine 92 are stored in frame buffer 56, via memory controller 94. Memory controller 94 provides an interface to frame buffer 56. After a 2D image has been stored in frame buffer 56 it is eventually retrieved by memory controller 94 and provided to a digital-to-analog converter (DAC) 99. DAC 99 converts the digital RGB signal into a corresponding analog RGB signal that is then provided to display device 58 and displayed thereon.

Additionally, graphics accelerator 54 is depicted as having a YUV converter 95 for use in playing back YUV 4:2:2 formatted digital images. YUV converter 95 includes a RGB converter 96, which is coupled to memory controller 94 and configured to convert the YUV 4:2:2 formatted digital image into a corresponding RGB digital image. The output of RGB converter 96 is provided to a scalar 98, which is coupled to RGB converter 96 and configured to scale the RGB digital image to a size that is appropriate for the selected display device 58. DAC 99 is coupled to the output of scalar 98 and configured to convert the scaled RGB digital image into a corresponding RGB analog signal that is suitable for driving display device 58.

Figure 5:
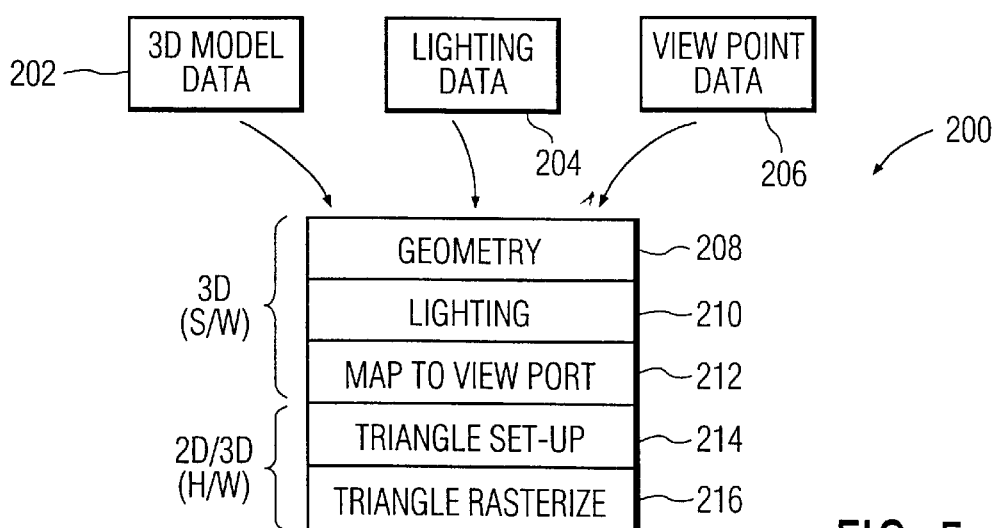
FIG. 5 is a block diagram depicting an exemplary 3D graphics processing pipeline for use in the graphics accelerator of FIG. 4, in accordance with the present invention.

FIG. 5 depicts a 3D graphics pipeline 200 as is typically found in the software of processor 42 and 3D graphics engine 92. 3D graphics pipeline 200 starts with a 3D model 202 of an object as defined by a set of vertices or similar coordinates. For example, a house can be modeled as a set of vertices that define the polygons or other shapes of the house. The vertices of the 3D model 202 are typically output by the application software running on processor 42. The application software also defines additional information regarding the lighting 204 and the applicable observation view-point 206 with respect to the object. For example, a house may be illuminated by the sun and viewed from a particular location with respect to the house and sun. The geometry process 208 essentially adjusts (e.g., positions scales) the 3D model 202 to where the view-point 206 is. The lighting process 210 then considers the location of the lighting source(s) 204 and the view-point 206 with respect to the surfaces of the 3D model 202 to adjust the shading and/or colors of these surfaces accordingly.

Next, the map to view-port process 212 maps the polygons or vertices of the 3D object's viewable regions to a two dimensional (2D) plane, creating a 2D image. A typical map to view port process 212 includes a 2D perspective rendering algorithm that creates a 2D image that appears to have depth when viewed, for example on a display device.

The triangle set-up process 214 determines how to represent these continuous surfaces as triangles having particular characteristics such as location, colors, and texture coordinates, etc. The triangle set-up process 214 also provides information to the triangle rasterize process 216 regarding how the triangle is oriented with respect to the view point 206.

Because most display devices (e.g., 58) are based on a 2D array of pixels, there is a need to convert the triangles into discrete pixels. The triangle rasterize process 216 performs this function by converting each triangle, as defined by the triangle set-up process, into corresponding pixels having particular colors. To accomplish this, the triangle rasterize process 216 typically includes a scan conversion process (not depicted) and a texture mapping process (not depicted). The scan conversion process identifies the required pixels and the texture mapping process identifies the particular color for each of the pixels.

Currently, for the mainstream PC market, the geometry 208, lighting 210 and map to view point 212 processes are completed by application software running processor 42, and the triangle set-up 214 and triangle rasterize 216 processes are implemented in the hardware of the graphics accelerator 54, and in particular 3D graphics engine 92.

Figure 6:
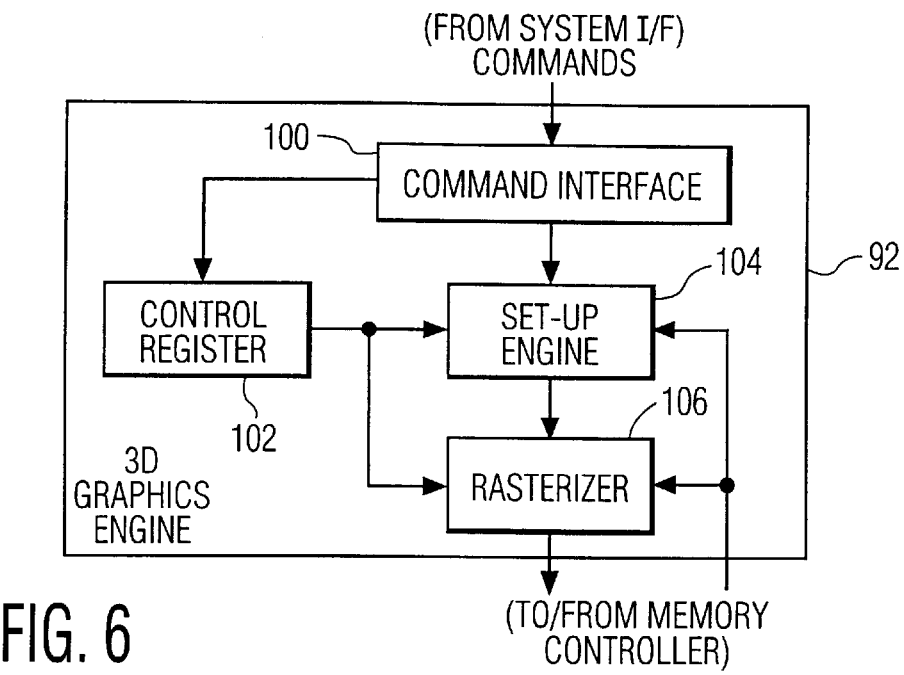
FIG. 6 is a block diagram depicting an exemplary 3D graphics engine having a rasterizer for use in the graphics accelerator in FIG. 4, in accordance with the present invention.

FIG. 6 depicts the triangle set-up 214 and triangle rasterize 216 processes as implemented in an exemplary 3D graphics engine 92. As shown, commands are received by a command interface 100, which is coupled to the system interface 90. The commands include 3D graphics commands and associated parameters, such as vertex information, as provided by processor 42 through system interface 90. For example, one command might be to "draw a triangle". The commands can be provided directly to a particular component(s) or stored in a commend register 102.

A set-up engine 104 is coupled to the command interface 100 and is typically responsive thereto. For example, triangle set up engine 104 can receive vertex information regarding the triangle that is to be drawn from command interface 100. The vertex information typically includes the positional coordinates (e.g., X, Y, and Z), color, texture coordinates (U and V, note that the U and V parameters do not represent chrominance in this situation), a homogeneous parameter (W), and possibly other parameters. Triangle set-up engine 104 processes the vertex information into triangle information, that, for example, can include information relating to the triangle (e.g., vertex 1, vertex 2 and vertex 3), the edges of the triangle (e.g., edge 1, edge 2 and edge 3), and slopes (e.g., dX/dY, dU/dY and dV/dY).

A rasterizer 106 is coupled to triangle set-up engine 104 and is configured to convert the triangles as defined by the triangle information into corresponding digital RGB pixel information. For example, the texture coordinates and slopes for those coordinates are used to apply a particular type of texture to a surface of the triangle being drawn. To accomplish this, the rasterizer 106 typically scan converts the triangle into an appropriate number of pixels, and determines the particular color for each pixel based on a mapping of a specific texture to each of the pixels. For example, a wall surface of a house may have a wood grain pattern that is to be applied to the displayed image, and therefore the triangle or triangles that represent the wall will have corresponding texture coordinates for the desired wood grain texture and the orientation of the wall. Thus, for example, each of the textured (e.g., wood grained) triangles that represent the wall of a house is scan converted to an appropriate number of RGB pixels, and each of these pixels has a texel (i.e., texture color value) mapped to it to set a particular color. Rasterizer 106 is also configured to store the resulting digital RGB pixel information at selected addresses within frame buffer 56, through memory controller 94, for example.

Figure 7:
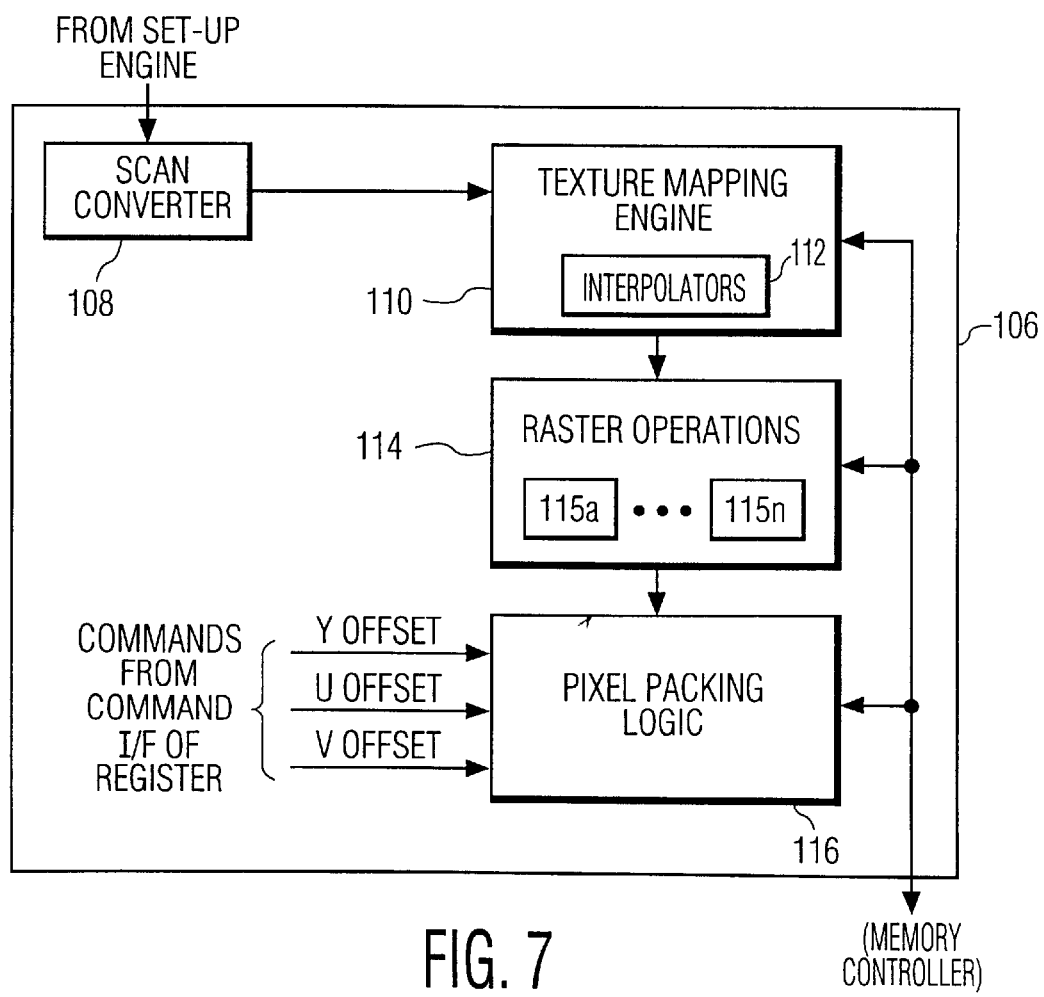
FIG. 7 is a block diagram depicting an exemplary rasterizer having a scan texture mapping engine, raster operations and pixel packing logic, for use in the 3D graphics engine of FIG. 6, in accordance with the present invention.

A particular advantage of the disclosed embodiment, is rasterizer 106 and its texture mapping capabilities. FIG. 7 us a block diagram depicting an exemplary rasterizer 106. Rasterizer 106 typically includes a scan converter 108 and a texture mapping engine 110. Scan converter 108 is coupled to triangle set-up engine 104 and receives triangle information, including, for example, positional coordinates, and edge and slope information therefrom. Scan converter 108 determines which pixels are within the triangle and establishes corresponding addresses for the "on screen" portion (see FIG. 9) of the frame buffer 56, which is used for displaying the triangle.

Figure 9:
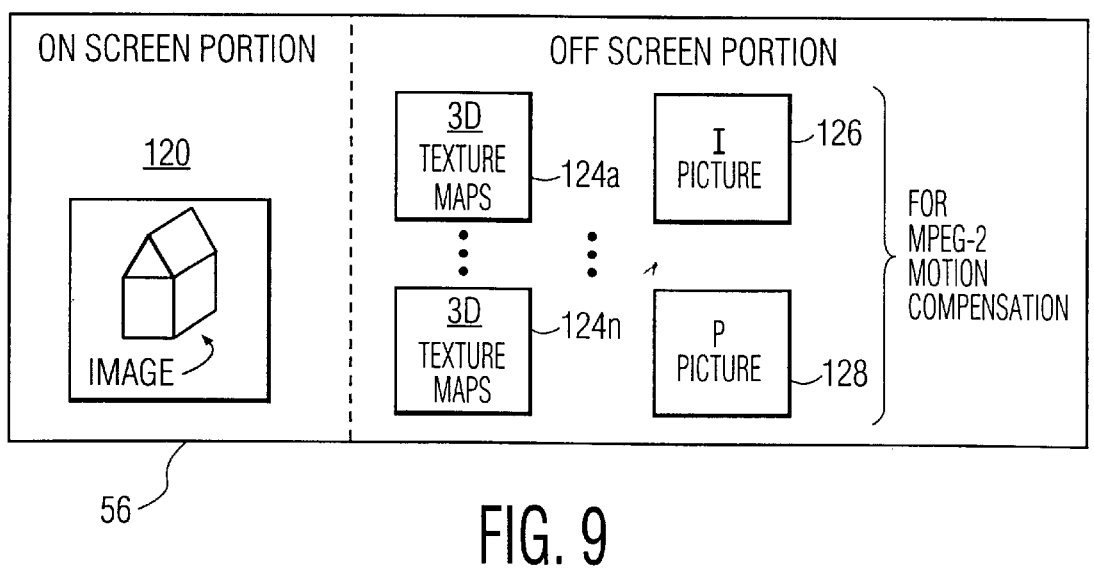
FIG. 9 is a block diagram depicting the allocation of memory within the frame buffer of the computer system in FIG. 8, in accordance with one embodiment of the present invention.

In FIG. 9, frame buffer 56 is depicted as being subdivided into an "on screen" portion 120 which contains the current image that is being built by rasterizer 106, and an "off screen" portion 122 that contains intermediate data, such as various texture maps 124a–n, that is used to create/modify the current image that is stored in the on screen portion 120.

The addresses determined by scan converter 108 in FIG. 7 can, for example, be stored in the off screen portion 122 of frame buffer 56 by scan converter 108, through memory controller 94. These triangle addresses will be used by texture mapping engine 110.

Referring back to FIG. 7, texture mapping engine 110 is coupled to scan converter 108 and is configured to receive the texture related information, including, for example, U, V, W, and related slope information therefrom. Texture mapping engine 110 determines a texture address for each pixel and retrieves a texture color from a texture map (e.g., 124a) within the off screen portion 122 of frame buffer 56. Texture mapping engine 110 typically includes a plurality of interpolators 112 that are configured to incrementally calculate the intermediate texture values based on starting points and slopes for U, V and W. Based on the results of interpolators 112, a texel is retrieved from the texture map 124a and assigned to each of the pixels. The texels for each of the pixels is then stored at the corresponding address (or addresses) in on screen portion 120 of frame buffer 56 for each pixel, by texture mapping engine 110 through memory controller 94.

Using a Modified Graphics Accelerator for MPEG-2 Motion Compensation

In accordance with the MPEG-2 specification, for B and P pictures, motion compensation can be selected per macroblock by the encoder, and is typically utilized heavily to reduce the bitstream. Decoding a motion compensated macroblock consists of calculating a predicted macroblock from one or more sources and adding to that macroblock coefficient data output from the IDCT (preferably computed by processor 42), one coefficient per pixel. This process is then repeated for each plane of the Y, U and V samples.

According to the MPEG-2 specification several encoding modes allow two reference macroblocks to be averaged to create one predicted macroblock, and each of those references may align to ½ pixel boundaries. Moreover, MPEG-2 allows a range of –256 to 255 for error coefficients per pixel. This of course translates to 9-bits of precision, which is more cumbersome to handle than byte-aligned 8-bit data. Finally, MPEG-2 supports modes which specifies two predictions for a macroblock, that is a dual-prime prediction for P pictures and a bi-directional prediction for B pictures. In these cases, the two predictions must be averaged to create the combined prediction.

In summary, the simplified Equation 1 below calculates the final predicted pixel values for each coordinate {x, y} from two references. Equation 2 adds in the IDCT output per pixel to the motion compensated output for each macroblock pixel at coordinates {x, y}.

$$F_{pred}(x, y) = [F_{pred1}(x, y) + F_{pred2}(x, y)]/2 \quad (1)$$

$$F_{mc}(x, y) = F_{pred}(x, y) + F_{IDCT}(x, y) \quad (2)$$

The commercially available Philips 9727 graphics accelerator represents a typical state-of art graphics accelerator, which, for example, is capable of producing 3D graphics based on control signals received from processor 42 (as depicted in FIGS. 4–7). The Philips 9727 is used herein as an example only to demonstrate the methods and apparatus of the present invention. Those skilled in the art will recognize, based on the present invention, that other existing or future graphics accelerators and/or 3D graphics engines (regardless of location) can be modified and/or used to provide DVD and/or MPEG-2 related processing.

It was found that tremendous similarities between the process of motion compensation and the process of 3D texture mapping existed. In fact, it was determined that the former is merely a subset of the latter. By exploiting this commonality, the methods and apparatus of the present invention are able to use the 9727's 3D texture mapping engine, with only a few modifications, to implement motion compensation.

In particular, it was recognized that texture mapping engine 110, in applying textures to triangles, is performing the nearly the same operation as that required for the motion compensation process 28 in decoding MPEG-2 video. Recall that MPEG-2 motion compensation utilizes motion vectors to identify square-shaped macroblocks of pixels (or picture elements (pels)) from previous and/or subsequent pictures that are to be used to generate the current B or P picture. These predicted blocks are essentially textures, and in this manner, the I and/or P picture(s) from where these predicted blocks are gathered are essentially texture maps similar to texture maps 124a–n. Thus, the only difference between this type of predicted block of MPEG-2 and a triangle used in the rasterizer is the shape. However, as known, every square can be divided into two equal triangles, and therefore texture mapping engine 110 within rasterizer 106 can also be used to determine this type of predicted block as part of the motion compensation process 28. In FIG. 9, an I picture 126 and a P picture 128 are illustrated along side texture maps 124a–n with off screen portion 122 of frame buffer 56.

A typical state-of-the-art texture mapping engine 110 includes a bilinear filtering capability (e.g., interpolators 112) that is used to enhance the texel color when, for example, the view point is sufficiently close to the textured surface (e.g., magnification). For example, if the view point of the wood grained wall of the house were to be very close to the wall, then there could be a tendency for the texture map 124a–n to be mapped to the wall such that the resulting image appears granular. This is because the resolution of most texture maps 124a–n is about 128 by 128 texels. By providing a bilinear filtering capability, which essentially interpolates between adjacent texels, this potential granularity is reduced. Thus, bilinear filtering is simply bilinear interpolation of a texture. Therefore, the ½ pixel sampling required by many MPEG-2 motion vectors is supported by the texture mapping engine's 110 bilinear filtering capability.

Another complexity of MPEG-2 motion compensation is that two motion vectors can be defined, each on ½ pixel coordinates. Thus, texture mapping engine 110 would need to bilinear filter each of these motion vectors and then average the two results to produce a predicted block. One of the features of a state-of-the-art texture mapping engine 110 is the capability to blend (e.g., by averaging texels) and map two textures to a triangle. For example, the wood grained wall of the house could include blended textures mapped from a wood grain texture map and a light map to produce a wood grained wall that has some lighter and some darker areas. Therefore, this multiple-texturing capability of the texture mapping engine 110 can be applied to MPEG-2 motion compensation by simply averaging the bilinear filtered pixels for each of the motion vectors to determine the motion compensated pixel.

As described above, according to the MPEG-2 specification, motion compensated macroblocks may also be specified along with a set of error coefficients, one per texel, as output from the IDCT 26 process. Each of these error coefficients (or macroblock coefficients) needs to be added a corresponding pixel. However, a typical 3D graphics engine 92 is not configured to perform a signed addition function, as is required to add a macroblock coefficient (which can be between −256 and 255).

Thus, there is a need to modify the 3D graphics engine 92 to provide this capability. This can be done by taking advantage of a common 3D graphics engine 92 capability known as a read-modify-write, which as the name implies stores a new or modified value to memory based on the previous value in the memory. The type of modification would typically depend on the selected raster operations (ROPs) 114. In a typical 3D graphics engine 92, several ROPs (e.g., 115a–115n) can be supported, such as, logical AND, and a logical OR. By adding a new ROP (e.g., a signed addition ROP) to 3D graphics engine 92, and in particular to raster operations 114 within rasterizer 106, the signed addition ROP needed for the MPEG-2 macroblock coefficient is provided. Thus, in accordance with one embodiment of the present invention an "8-bit signed addition ROP" is provided within modified graphics accelerator 84 to handle the macroblock coefficient signed addition.

Figure 11:
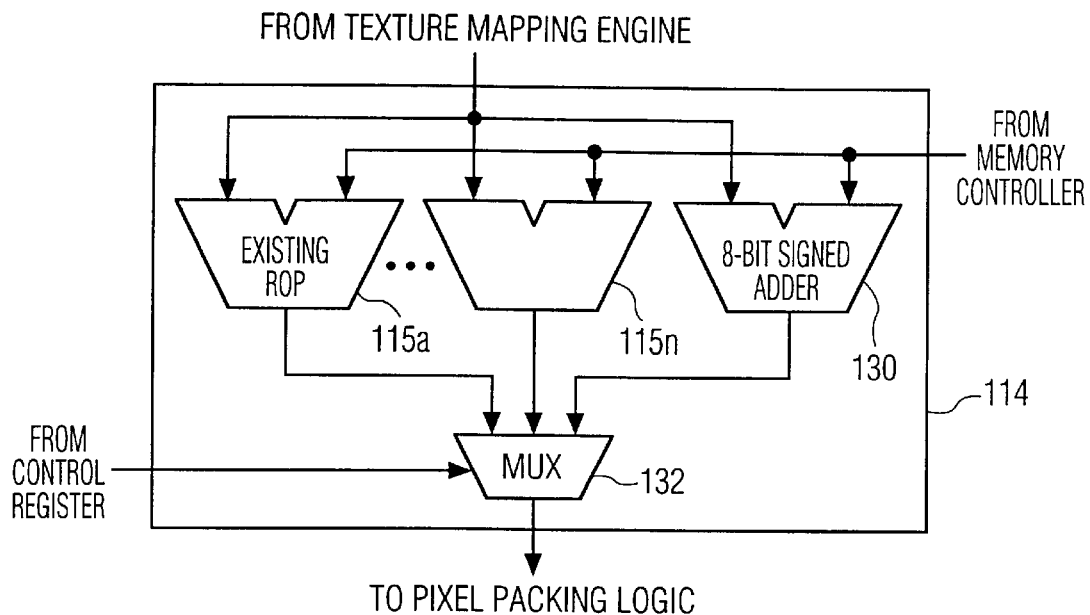
FIG. 11 is a block diagram depicting a raster operations of the rasterizer in FIG. 7, in accordance with one embodiment of the present invention.

FIG. 11 depicts an exemplary raster operations 114 having existing ROPs 115a–n and an 8-bit signed adder 130. The outputs form existing ROPs 115a–n and 8-bit signed adder 130 are provided to a multiplexer 132, which is controlled by control register 102 to select among the ROPs.

As described above, by making modifications to a typical graphics engine 92 (i.e., providing an signed addition ROP) and modifying the graphics accelerator's driver software 82 as needed to accomplish the processing (described above), the resulting modified graphics accelerator 84 provides MPEG-2 motion compensation. This is an extremely cost-effective implementation of the motion compensation process 28.

Thus, only one minor hardware modification is required to complete Equation 2. 8-bit signed adder ROP 130 was provided to add the output of texture mapping engine 110 to the IDCT coefficient which would be fetched from memory either DRAM 48, or frame buffer 56. Additionally, the modified graphics accelerator 84 can also be programmed to take a second pass through another set of signed 8-bits to support the full 9-bit error coefficient range, as allowed by MPEG-2.

Using a Modified Graphics Accelerator for Deplanarization

The next DVD related process to be offloaded to the graphics accelerator is the planar YUV 4:2:0-to-4:2:2 conversion process. Although a typical graphics accelerator is capable of taking YUV 4:2:2 picture and reformatting it to a corresponding RGB picture, conversion from YUV 4:2:0 to YUV 4:2:2 is not usually supported and therefore this functionality needs to be added to the modified graphics accelerator in accordance with the present invention.

The motion compensation process 28, as described above, produces final macroblock pixel values for three components, luminance (Y) and chrominance (U and V), which are typically output in a planar format commonly referred to as YUV 4:2:0. Unfortunately, graphics accelerators today (including the 9727) tend to convert to RGB from an interleaved YUV 4:2:2, where the U and V planes are half the size of the luminance matrix in X, but the same size in Y. Therefore, conversion from YUV 4:2:0 to YUV 4:2:2 format requires upsampling the chrominance components in Y.

Converting planar YUV 4:2:0 to an interleaved 4:2:2 format involves reading a byte of data from the planar source and writing the byte to a different location in the destination 4:2:2 plane. Unfortunately, that requires several reads and writes per pixel, which, over a picture, can, for example, significantly degrade the performance of purely software solutions, as evidenced by the processor utilization figures in the table of FIG. 3.

Complicating matters, MPEG-2's 4:2:0 planar scheme does not specify chroma sample points on pixel centers vertically (as it does horizontally). As such, to upsample interlaced video data technically requires a 2-tap vertical filter of $\{\frac{1}{4}, \frac{3}{4}\}$, $\{\frac{1}{2}, \frac{1}{2}\}$ or $\{\frac{3}{4}, \frac{1}{4}\}$, depending on whether the picture is an odd or even field and whether the line is odd or even within the field. This requires at least a read of 2 sample points and one or two adds and a shift per pixel, again this is typically far too taxing for a software-only solution. Therefore, software-only solutions are usually forced to compromise optimal quality and take a shortcut by selecting the nearest chroma sample point and replicating vertically as required. Such an approximation leads to colors that are not correctly aligned with intensity and results in compromised picture quality.

Fortunately, converting planar YUV 4:2:0 to interleaved 4:2:2 also can be performed via texture mapping engine 110 within 3D graphics engine 92. In this case, the Y, U and V pictures (or planes) can be broken into squares measuring a power of two a side. Each square becomes the source texture, which is mapped to the destination 4:2:2 picture; in the case of U and V, texture mapping engine 110 is instructed to magnify (upscale) by 2× in Y. One pass through each Y, U and V picture is required to complete the task.

Figure 12:
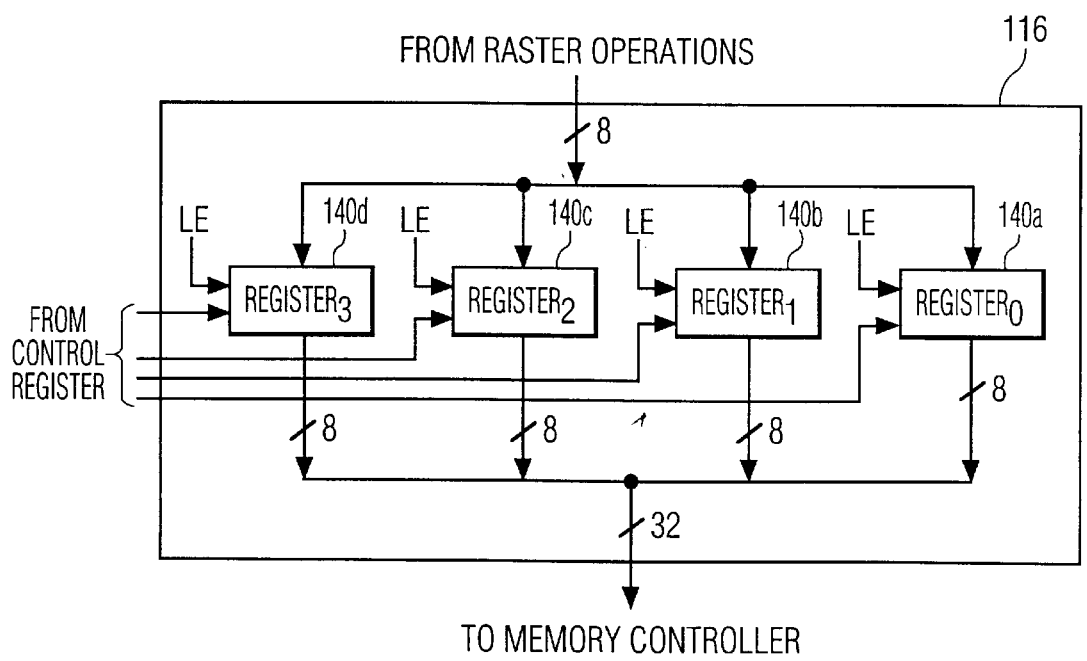
FIG. 12 is a block diagram of a pixel packing logic, of FIG. 7, having a plurality of multiplexers for mapping Y, U and V image data, in accordance with one embodiment of the present invention.

Only one modification was required to complete the interleaving support in the 9727. The output data path following texture mapping engine 110 is modified to allow generated texels to be channeled to specific byte lanes at specific offsets and increments, while other byte lanes would be masked on the write to the destination. This allows the Y, U and V values to be written to their proper byte locations, without overwriting the results of a previous pass. In accordance with the disclosed embodiment, this amounted to adding four 8-bit registers 140a–d in the existing data path, as depicted in FIG. 12, as being added to pixel packing logic 116, which is coupled to receive the output from raster operations 114.

Figure 10A:
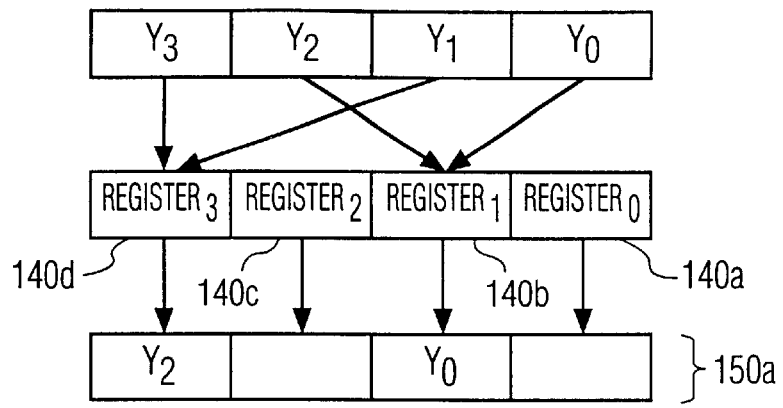
FIGS. 10a through 10c are block diagrams depicting a mapping sequence for Y, U and V image data as mapped by the pixel packing logic of the rasterizer in FIG. 7, in accordance with one embodiment of the present invention.
Figure 10B:
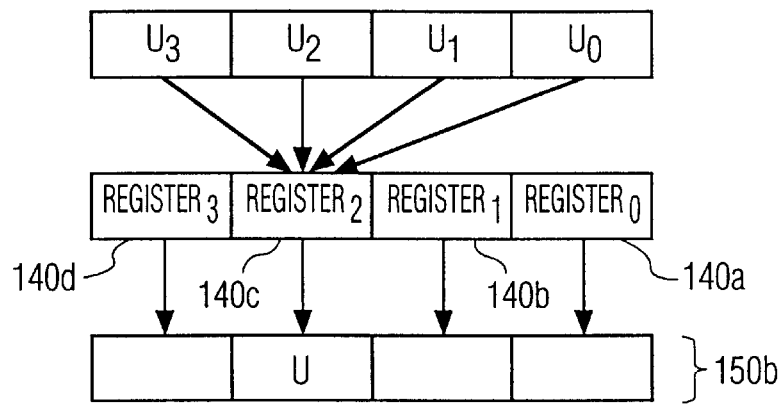
Figure 10C:
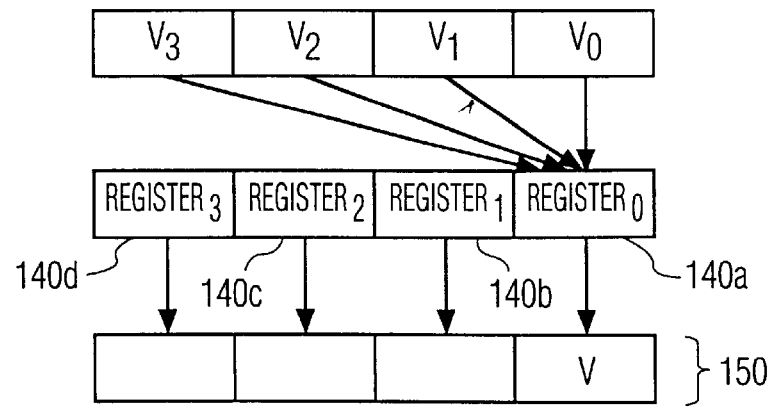

FIGS. 10a, 10b and 10c depict the byte lane arrangements for Y, U and V, respectively. In FIG. 10a, the Y values ($Y_{0-4}$) are selectively mapped (via registers 140b, 140d, 140b, and 140d, respectively) which results in an offset pattern 150a in which a Y value is placed once every two bytes. In FIG. 10b, the U values ($U_{0-4}$) are selectively mapped (via register 140c) which results in an offset pattern 150b in which a U value is placed once every four bytes. Similarly, in FIG. 10c, the V values ($V_{0-4}$) are selectively mapped (via register 140a) which results in an offset pattern 150c in which a V value is placed once every four bytes.

As for the seemingly awkward problem of supporting "proper" upsampling via a 2-tap vertical filter, it was found that this operation can be viewed as simply a variant of bilinear filtering and therefore can be fully supported by texture mapping engine 110. By simply adding (or subtracting) an offset of {¼, ½, or ¾} to the starting texture address which points to the source 4:2:0 picture, texture mapping engine 110 bias all subsequent texture sample points, which essentially mimics the effects of the vertical filter. As such, unlike competing solutions, the methods and apparatus of the present invention are able to provide the proper, high quality upsampling as the MPEG-2 specification intended.

Using a Modified Graphics Accelerator for OSD Blending

For the final stage, the decoded MPEG-2 video needs to be alpha blended with the sub-picture(s). For each pixel within each picture, the video component must be blended with the sub-picture component to produce the final output pixel via the following equation, where "a" (alpha) provides 16 levels of blend between the video color and the sub-picture color (one of possible 16 colors):

$$F_{out}(x, y) = F_{YUV422}(x, y)*a + F_{subpict}(x, y)*(1-a) \quad (3)$$

In accordance with the disclosed embodiment, the sub-picture alpha blending process is provided by making a minor change to the existing architecture of the 3D graphics engine 92, which essentially extends the display refresh circuits (not shown). The display refresh circuits in the 3D graphics engine 92 of the 9727, for example, already support the mixing of 2 layers of bitmapped data; one can be YUV 4:2:2 and the other a variety of RGB formats. The YUV 4:2:2 is, therefore, converted to RGB and mixed on a per pixel basis with the second RGB layer via color key. Thus, for example, by adding two parallel 4-bit multipliers and a 16-entry lookup table, the existing mixing capability can be extended to support true translucent overlay of the sub-picture on the video. Each sub-picture pixel is represented with a 4-bit index to the table and accompanying 4-bit blend value. For each pixel drawn on the screen, the 3D graphics engine converts the YUV 4:2:2 video pixel to RGB, does a table lookup to get the RGB value for the sub-picture and then performs the blend via 2 multiplies and an add, as shown in Equation 3, above.

Consequently, the methods and apparatus of the present invention provide a modified graphics accelerator 84 that is also capable of performing DVD playback along with the processor. By way of example, the 9727 graphics accelerator was modified (as described above) to implement motion compensation, YUV 4:2:0-to-4:2:2 conversion and alpha blending in hardware, to deliver up to 30 frames/sec playback of typical DVD content and bit-rates on a 266 MHz Pentium II™ platform.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. An apparatus for use in a computer system having a processor to support graphics generation and digital video processing, the apparatus comprising:

a set-up engine that is responsive to at least one command signal from a processor and configured to convert vertex information within the command signal into corresponding triangle information, wherein the triangle information describes a triangle in a three dimensional space;

a converter coupled to the set-up engine and configured to determine digital pixel data for the triangle based on the triangle information; and a texture mapping engine coupled to the converter, comprising
components that are configured to modify the digital pixel data based on the triangle information and at least one digital texture map, and wherein the texture mapping engine is further configured to generate motion compensated digital image data based on at least one digital image map and at least one motion vector as received from the processor, using the components that are configured to modify the digital pixel data.

2. The apparatus as recited in claim 1, wherein the digital image map is a macroblock containing a digital pixel data from a digital picture.

3. The apparatus as recited in claim 2, wherein the digital picture is a MPEG generated I picture.

4. The apparatus as recited in claim 2, wherein the digital picture is a MPEG generated P picture.

5. The apparatus as recited in claim 2, wherein the digital picture is a YUV formatted picture.

6. The apparatus as recited in claim 2, wherein the components of the texture mapping engine further include at least one bilinear interpolator that is configured to determined interpolated digital pixel data based on a first and a second digital pixel data, and wherein the bilinear interpolator is configured to perform a bilinear filtering of a macroblock having sub-pixel coordinates to generate one predicted macroblock having pixel-aligned coordinates.

7. The apparatus as recited in claim 6, wherein the components of the texture mapping engine are further configured to perform a first bilinear filtering based on a first motion vector and on a second bilinear filtering based on a second motion vector, and to average results of the first bilinear filtering and results of the second bilinear filtering to generate one predicted macroblock having pixel-aligned coordinates.

8. The apparatus as recited in claim 1, further comprising at least one raster operation coupled to the texture mapping engine, wherein the raster operation is configured to add a signed integer value to the digital pixel data as generated by the texture mapping engine.

9. The apparatus as recited in claim 8, wherein the signed integer is an IDCT coefficient.

10. The apparatus as recited in claim 8, wherein the raster operations includes an 8-bit adder.

11. The apparatus as recited in claim 1, wherein the apparatus is capable of being coupled to and accessing a memory using a read-modify-write operation.

12. The apparatus as recited in claim 1, wherein the digital data stream is generated from an MPEG-2 data stream.

13. A computer system that is capable of providing video playback of all encoded data stream, the computer system comprising:

a processor configured to run at least one computer program selected from the set of an application, a decoder, and a graphics driver;

a data bus mechanism coupled to the processor;

a primary memory coupled to the data bus mechanism and configured to be accessed via the data bus mechanism;

a graphics engine coupled to the data bus mechanism, the graphics engine being responsive to at least one command from the processor and configured to
(1) generate digital image data based on at least one command signal from the processor, using a first set of components of the graphics engine,
(2) generate motion compensated digital image data based on at least one digital image and at least one motion vector, using the first set of components of the graphics engine,
(3) concert a YUV 4:2:0 formatted picture to YUV 4:2:2 formatted picture,
(4) convert the YUV 4:2:2 formatted picture to a RGB formatted picture,
(5) scale the RGB formatted picture,
(6) convert the RGB formatted picture to an analog signal; and a display device coupled to the graphics engine and configured to display the analog signal.

14. A method for generating graphics and processing digital video signals in a computer system, the method comprising:
(1) selectively using components of a graphics engine to generate digital image data, based on at least one command signal, comprising
(a) converting vertex information within the command signal into corresponding triangle information, wherein the triangle information describes a triangle in a three dimensional space,
(b) determining digital pixel data for the triangle, based on the triangle information,
(c) modifying the digital pixel data based on the triangle information and at least one digital texture map;
(2) selectively using the same components of the graphics engine so used is (1) to generate motion compensated digital image data by generating motion compensated digital image data based on at least one digital image map and at least one motion vector.

15. The method as recited in claim 14, wherein the digital image map is a macroblock containing a digital pixel data from a digital picture.

16. The method as recited in claim 15, wherein the digital picture is a MPEG generated I picture.

17. The method as recited in claim 15, wherein the digital picture is a MPEG generated P picture.

18. The method as recited in claim 15, wherein the digital picture is a YUV formatted picture.

19. The method as recited in claim 15, wherein step (2) further comprises:
using a bilinear interpolator of the components of the graphics engine to determine interpolated digital pixel data based on a first and a second digital pixel data; and
using the bilinear interpolator to perform a bilinear filtering of a macroblock having sub-pixel coordinates to generate one predicted macroblock having pixel-aligned coordinates.

20. The method as recited in claim 19, wherein step (2) further comprises:
performing a first bilinear filtering based on a first motion vector and on a second bilinear filtering based on a second motion vector; and
averaging the results of the first bilinear filtering and the results of the second bilinear filtering to generate one predicted macroblock having pixel-aligned coordinates.

21. The apparatus as recited in claim 14, wherein step (2) further comprises:
adding a signed integer value to the digital pixel data.

22. A method for providing video playback of an encoded data stream in a computer system, the method comprising:
coupling a processor to a graphics engine;
with the graphics engine,
generating digital image data based on at least one command signal from the processor, using components of the graphics image,
generating motion compensated digital image data based on at least one digital image and at least one motion vector, substantially using the components of the graphics engine that are used for generating the digital image data,
converting a YUV 4:2:0 formatted picture to a YUV 4:2:2 formatted picture,
converting the YUV 4:2:2 formatted picture to a RGB formatted picture,
scaling the RGB formatted picture, and
converting the RGB formatted picture to an analog signal; and
displaying the analog signal.

* * * * *